July 20, 1954

W. B. H. HELMERS 2,684,100

ANTISKID DEVICE

Filed Jan. 30, 1951

INVENTOR.
Willem Bernard Henrie Helmers
BY
Robert E. Burns
ATTORNEY

July 20, 1954 W. B. H. HELMERS 2,684,100
ANTISKID DEVICE
Filed Jan. 30, 1951 2 Sheets-Sheet 2
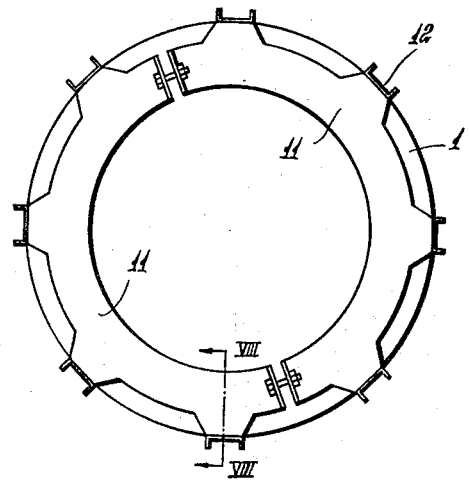
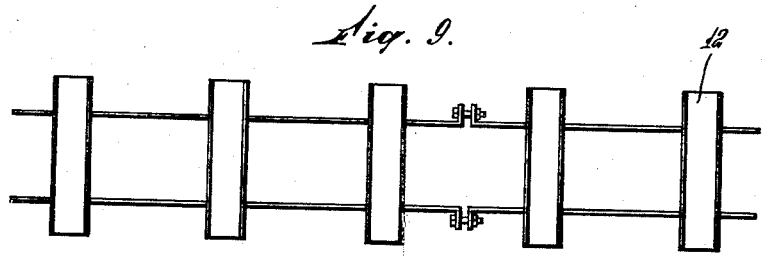
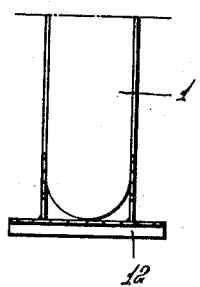
INVENTOR.
Willem Bernard Henrie Helmers
BY
ATTORNEY Patented July 20, 1954

2,684,100

UNITED STATES PATENT OFFICE 2,684,100

ANTISKID DEVICE

Willem Bernard Henrie Helmers,
Breda, Netherlands

Application January 30, 1951, Serial No. 208,579

Claims priority, application Netherlands
February 6, 1950

2 Claims. (Cl. 152—230)

It is usual to provide the wheels of vehicles, in particular motor cars, which have to ride on a smooth surface, with devices for increasing the friction between the wheels and the road surface. Mostly the so-called snow-chains are still used for this purpose, said snow chains consisting of a combination of chains which can be attached around a tyre. This kind of snow chains are very useful if one has to cope with relatively loose snow. Things are different when a road surface is covered with very hard snow and a fortiori with an ice crust.

In such case chains will not penetrate—at least not deep enough—into the very hard crust, so that the vehicles will slip all the same. In that case there is not only a chance of the wheels racing, but also of the wheels skidding, which is often more dangerous still.

Further it should be noted that chains are completely useless when the surface is muddy or sandy, because in such a case what is to be accomplished amounts to enlarging the friction area of the wheels to which purpose chains are completely insufficient.

The purpose of the invention is to offer a solution for the above-mentioned inconveniences.

To this end the device according to the application comprises two supporting members, adapted to be mounted on either side of a vehicle tyre, each supporting member being supplied with a number of radially directed tooth-shaped projections, each projection of one supporting member being connected by means of one or more friction members with one or more projections of the other supporting member. According to the invention each supporting member may consist of a number of flat segments, the corresponding extremities of which are connected by a relatively short connecting member the opposite extremities being interconnected by a longer connecting member and carrying the tooth-shaped projections.

According to the invention each supporting member may also consist of a flat circular ring composed of at least two parts which are connected to one another in such a manner that they can be detached. Further according to the invention the various friction members may have such a length that one supporting member can only be fittingly mounted on a tyre by having its tooth-shaped projections lie opposite the spaces between the tooth-shaped projections of the other supporting member.

Finally according to the invention each friction member may consist of a flat strip, to which a rib is firmly attached so as to form an angle with this strip.

In order to elucidate the invention a few embodiments of the device will be described with reference to the drawing.

Fig. 7 is a side view of still another embodiment specially suited for a soft or loose surface;

Fig. 8 is a partial cross section of the device according to Figure 7;

Fig. 9 represents the device according to Fig. 7 flattened out.

Figure 1:
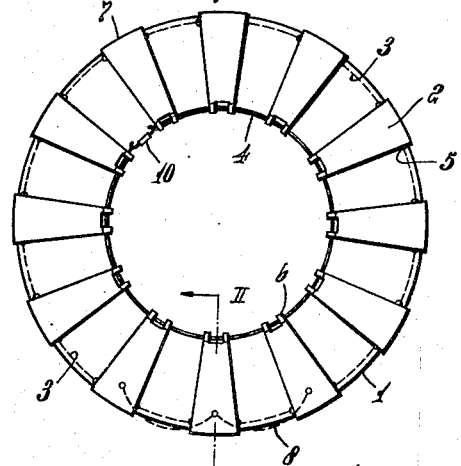
Fig. 1 is a side view of a wheel with a device provided thereon according to the invention in a first embodiment.
Figure 2:
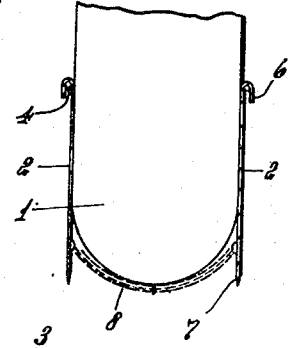
Fig. 2 is a section taken on the line II—II in Fig. 1 on an enlarged scale.

The Figures 1 and 2 show a first embodiment of the device mounted on a tyre 1.

On either side of the tyre a set of flat segments 2 is located which segments are on the one hand connected to one another by longitudinal chains 3 and on the other hand by a flexible cable 4. The longitudinal chains 3 are attached to eyes 5 of the segments, the cable 4 resting in claws 6 in such a way that it can be disengaged therefrom. The width of the segments close to the eyes 5 is greater than at the side on which the claws 6 are provided, while also the added length of a set of longitudinal chains 3 is greater than the length of the cable 4. Thanks to these features all the segments can be attached simultaneously in radial position against a side of the tyre.

Each of the segments 2 is provided at its broad extremity with a sharp tooth-shaped projection 7. Besides each segment is connected by means of two transverse chains 8 with the respective segments located at either side of the segment directly opposite. These transverse chains are secured to eyes 9 which are located at the insides of the segments 2.

In order to adapt the device to be mounted on and round a tyre, the cables 4 are each interrupted by a detachable connecting member 10. The effect of the device described in the foregoing, for instance on a frozen road surface, is dual. Owing to the fact that the sharp teeth 7 penetrate deep into the hard ice crust the chance of the wheels skidding has been practically eliminated, the teeth at the same time helping to prevent the wheels from racing.

Figure 3:
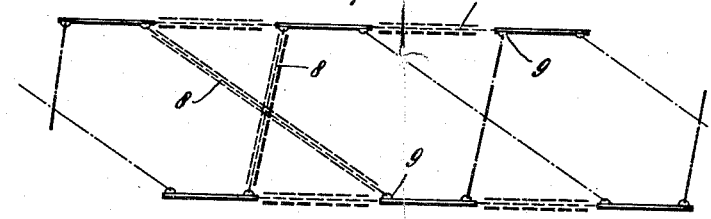
Fig. 3 is a partial plan view of a device substantially according to Fig. 1, however with transverse chains of unequal length.

Besides, however, by each of the two rings of teeth a groove is drawn in the ice crust, as a consequence of which the ice crust between said grooves is crumbled and therefore gives a much greater frictional resistance for the transverse chains 8. In the slippery, hard road surface a track is formed as it were, in which the transverse chains—which chains themselves naturally cannot be constructed with sharp edges—find sufficient resistance to prevent racing of the wheels. According to the embodiment of Fig. 3 the tooth shaped projections at one side of a tyre are staggered half a circular pitch with respect to the one at the other side. It will be clear that hereby the resistance against skidding will be as great in any possible position of the device with respect to the ground.

Figure 5:
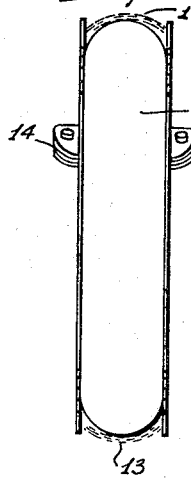
Fig. 5 is a section on the line V—V in Figure 4.
Figure 4:
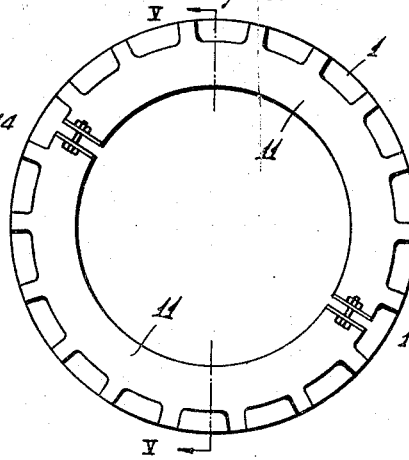
Fig. 4 is a side view of another embodiment, provided on a tyre.
Figure 6:
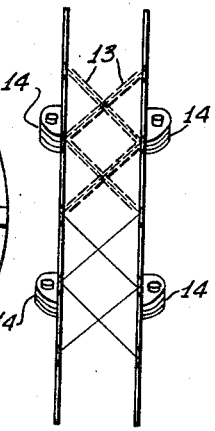
Fig. 6 is a plan view of the embodiment according to Figure 4.

In the Figures 4, 5 and 6 an embodiment is shown in which the tooth-shaped projections are not provided on separate supporting members, but on a joint supporting member.

According to the said figures on each side of the device there is a flat half circular ring 11, each made up of two halves which are secured to one another with the aid of bolt-and-nut connections 14, in such a way that they are detachable. The two plates 11 are connected with one another by chains 13 which extend across the tread of the tyre and are preferably criss-crossed as shown in Fig. 6.

The Figures 7, 8 and 9 relate to an embodiment which is specially intended to be used on a very loose or muddy surface. This form is for instance very much suited for converting motor vehicles such as the so-called jeeps into agriculture tractors.

In this construction the transverse chains are replaced by short U-irons 12, which in addition to a large carrying supporting surface also have resistance ribs extending in radial direction.

I claim:

1. A device for preventing wheels of vehicles provided with pneumatic tyres from skidding, characterized in that said device consists of two supporting members adapted to be mounted on either side of a tyre, each supporting member comprising a flat circular ring composed of at least two parts detachably connected by connecting members, said parts carrying coplanar tooth shaped projections formed integrally therewith and means connecting said supporting members to hold them on the wheel.

2. A device for preventing wheels of vehicles provided with pneumatic tyres from skidding, characterized in that this device comprises two supporting members adapted to be mounted against opposite side walls of a tyre, each supporting member having its outer circumference provided with a number of radially directed flat tooth-shaped projections, located beside the tread parallel to the respective side walls of the tyre, each supporting member consisting of a flat circular ring, composed of at least two parts connected in a manner to be detachable and elements extending across the tread of the tyre and connecting said supporting members with one another.

References Cited in the file of this patent

UNITED STATES PATENTS

| Number | Name | Date |
|---|---|---|
| 740,184 | Sainsbury | Sept. 29, 1903 |
| 1,028,490 | Pugh | June 4, 1912 |
| 1,595,339 | Brittain | Aug. 10, 1926 |
| 2,494,850 | Williams | Jan. 17, 1950 |
| 2,552,168 | Goolsby | May 8, 1951 |

FOREIGN PATENTS

| Number | Country | Date |
|---|---|---|
| 26,343 | Great Britain | 1905 |
| 782,234 | France | May 31, 1935 |